United States Patent [19]
Yanagi et al.

[11] Patent Number: 5,312,699
[45] Date of Patent: May 17, 1994

[54] POWER STORAGE SYSTEM

[75] Inventors: Chihiro Yanagi, Akashi; Yasuhira Kikuoka, Kako; Keiichi Kugimiya, Kobe; Masakazu Yoshino, Kobe; Michio Tokura, Kobe; Sabuo Ueda, Takasago, all of Japan

[73] Assignees: The Kansai Electric Power Co., Ltd., Osaka; Mitsubishi Jukogyo Kabushiki Kaisha, Tokyo, both of Japan

[21] Appl. No.: 953,790

[22] Filed: Sep. 30, 1992

[30] Foreign Application Priority Data

Oct. 11, 1991 [JP] Japan .................................. 3-263798

[51] Int. Cl.[5] ............................................. H07M 8/18
[52] U.S. Cl. ......................................... 429/22; 429/26; 204/262; 204/265; 204/266
[58] Field of Search ............................ 429/22, 26, 30; 204/262, 265, 266

[56] References Cited

U.S. PATENT DOCUMENTS

| | | | |
|---|---|---|---|
| 4,743,516 | 5/1988 | Noguchi et al. | 429/26 X |
| 4,801,369 | 1/1989 | Draper et al. | 204/265 X |
| 4,853,100 | 8/1989 | Hsu | 204/262 X |
| 5,034,287 | 7/1991 | Kunz | 429/30 X |

Primary Examiner—Stephen Kalafut
Attorney, Agent, or Firm—Wenderoth, Lind & Ponack

[57] ABSTRACT

A compact power storage system can efficiently generate electric power by storing surplus electric power, and can be constructed in a short working period without being restricted by conditions of the location where it is to be installed. The power storage system comprises a unitary electrolytic and fuel cell having a solid oxide electrolyte, a steam feed system for feeding steam to the cell, a hydrogen store and an oxygen store for storing hydrogen and oxygen produced in the cell, a heat-exchanger system for receiving heat of the exhaust from the cell, a space-heating hot water feed system for heating water using heat obtained from the exhaust, and a space-heating cold water feed system communicating with an absorption refrigerating machine for cooling water through the absorption process using heat obtained from the heat-exchanger system.

8 Claims, 1 Drawing Sheet

POWER STORAGE SYSTEM

BACKGROUND OF THE INVENTION

1. Field of the Invention

The present invention relates to a power storage system for efficiently storing electric power such as surplus electric power produced at night or the like.

2. Description of the Prior Art

An electric power storage system is known in which surplus electric power produced at night is discharged during the day to accommodate for peak loads and thereby effectively utilize the power in the case where a difference in power consumption during the day and at night is remarkably large. The most representative one of these system is a pumped storage power station in which water is pumped up to a dam at night and electric power is generated by means of a hydraulic turbine generator during a period of the day when power consumption is large.

A pumped storage power station is constructed in a mountainous region by building a dam; hence, its location is limited, and the period of its construction is also long. Therefore, it cannot be used to respond quickly to the rapidly increasing demand for electric power in the case where there is a difference in power consumption during the day and at night. In addition, the efficiency of a pumped storage power station is about 60-70%. Therefore, a power storage system having a higher storage efficiency has been desired.

SUMMARY OF THE INVENTION

It is therefore one object of the present invention to provide a power storage system which can be installed in a town and city area, and which can be constructed in a shorter time and is more efficient than a pumped storage power station.

According to the present invention, there is provided a power storage system comprising a combined electrolyzing and power generating means having a solid oxide electrolyte for serving as a steam electrolyzing cell and as a fuel cell, steam feed means for feeding steam to the aforementioned combined electrolyzing and power generating means, hydrogen storage means and oxygen storage means for storing hydrogen and oxygen produced in the combined electrolyzing and power generating means, heat-exchange means for receiving heat of exhaust from the combined electrolyzing and power generating means, space-heating hot water feed means heating water by using heat produced by the exhaust of the combined electrolyzing and power generating means, and space-cooling cold water feed means including an absorption refrigerating machine for cooling water by using heat obtained from the heat-exchange means.

According to the present invention, by feeding steam and also feeding electric power to the combined electrolyzing and power generating means, the steam is broken down into oxygen and hydrogen. The produced hydrogen and oxygen are respectively stored in the hydrogen storage means and in the oxygen storage means.

If the hydrogen and oxygen stored in the respective storage means are returned to the combined electrolyzing and power generating means, then the oxygen penetrates through the electrolyte and reacts with the hydrogen at a cathode and the oxygen and hydrogen are reformed into steam. When the oxygen penetrates the electrolyte, power is generated by a fuel cell action, and the chemical energy possessed by the hydrogen can be recovered as electric power.

In addition, when the combined electrolyzing and power generating means is operated as a fuel cell, heat is generated. This heat is transferred by the heat-exchange means to the space-heating hot water feed means and to the space-cooling cold water feed means, whereby hot water for space-heating and cold water for cooling a space are respectively obtained.

According to the power storage system of the present invention the storage of electric power by electrolyzing steam into hydrogen and oxygen and the generation of electric power by reacting hydrogen and oxygen are effected alternately in the same combined electrolyzing and power generating means. Hence the system is compact, its construction cost is inexpensive, and it can be constructed in a short period of time. Moreover, neither a special lay of the land nor a limited energy source is necessary as is the case with the pumped power storage station. Rather, the system of the present invention can be installed at any location. Further, heat produced when electric power is generated in the combined electrolyzing and power generating means can be effectively recovered as energy for space-heating and space-cooling. Accordingly, the efficiency of the system is high.

The above-mentioned and other objects, features and advantages of the present invention will become more apparent by referring to the following description of one preferred embodiment of the present invention made in conjunction with the accompanying drawing.

BRIEF DESCRIPTION OF THE DRAWING

The accompanying drawing, consisting of only a single sheet, is a system diagram of one preferred embodiment of a power storage system according to the present invention.

DESCRIPTION OF THE PREFERRED EMBODIMENT

Figure 1:
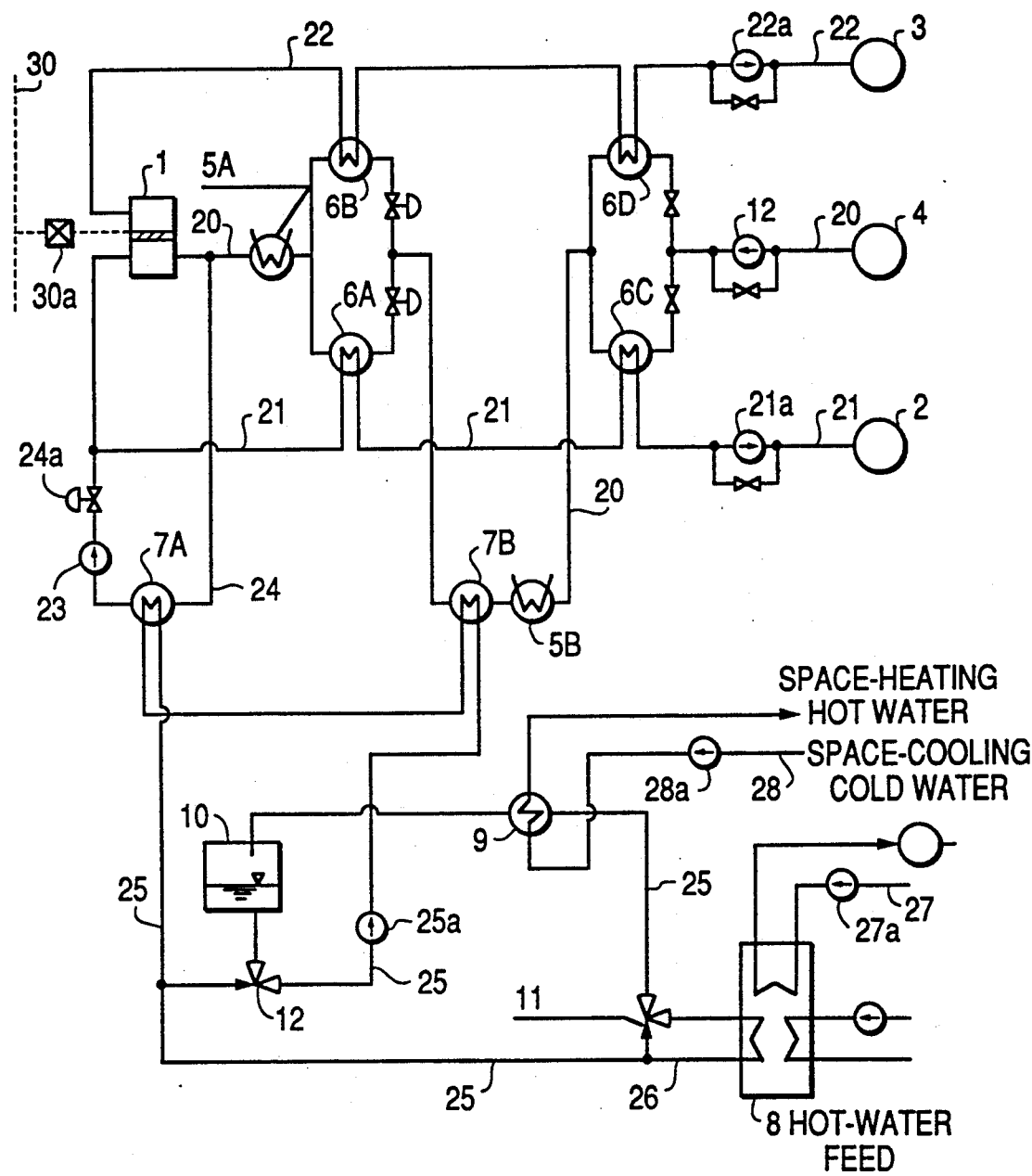

Now, a power storage system according to the present invention will be described with reference to the FIGURE. In this FIGURE, reference numeral 1 designates a reversible type of solid oxide electrolytic cell (hereinafter called "reversible SOE electrolyzing cell"), which produces hydrogen and oxygen by electrolyzing steam, and which causes hydrogen and oxygen to react to form steam so as to serve as a fuel cell. In this reversible SOE electrolyzing cell 1, a plate of an oxygen ion conductor such as zirconia stabilized by yttria is employed as electrolyte, a porous anode and cathode (for instance, made of platinum) are mounted on opposite surfaces of the plate, and these electrodes are connected to an A.C. power line 30 via a converter 30a. The reversible SOE electrolyzing cell 1 can be operated as a steam electrolyzing cell by electrolyzing steam, and can be operated as a fuel cell producing steam by reacting hydrogen and oxygen in which case electric power is generated by oxygen ions penetrating the electrolyte.

Reference numeral 4 designates a water tank, and a line 20 connected to the same water tank 4 is connected to the cathode side of the reversible SOE electrolyzing cell 1 through a pump 12, a regenerative heat-exchanger 6C and a regenerative heat-exchanger 6D disposed in parallel to each other, a heat-exchanger 7B, a regenerative heat-exchanger 6A and a regenerative heat-exchanger 6B disposed in parallel to each other, and a heater, in succession.

Reference numeral 2 designates a hydrogen tank and a hydrogen line 21 connected to the hydrogen tank 2 and having a compressor 21a is connected to the cathode side of the reversible SOE electrolyzing cell 1 via the regenerative heat-exchanger 6C and the regenerative heat-exchanger 6A.

Reference numeral 3 designates an oxygen tank, and an oxygen line 22 connected to the oxygen tank 3 and having a compressor 22a is connected to the anode side of the reversible SOE electrolyzing cell 1 via the regenerative heat-exchanger 6D and the regenerative heat-exchanger 6B.

A line 24 connects the lines 20 and 21 to the reversible SOE electrolyzing cell 1. A circulator 23, a valve 24a, and a heat-exchanger 7A are disposed in line 24.

Reference numeral 8 designates an absorption refrigerating machine, through which a space-cooling cold water line 27 having a pump 27a passes to refrigerate water within the line 27. Reference numeral 9 designates a space-heating heat-exchanger, through which a space-heating hot water line 28 having a pump 28a passes to heat water within the line 28.

A bottom portion of a water feed tank 10 is connected via switching valve 12 to a line 25 provided with a pump 25a. The line 25 may return water to the water feed tank 10 through the heat-exchanger 7B, the heat-exchanger 7A, a switching valve 11 and the space-heating heat-exchanger 9. In addition, a branch line 26 is branched from the line 25 upstream of the switching valve 11, and is connected to the switching valve 11 via the absorption refrigerating machine 8.

In this preferred embodiment, when storing electric power, water pumped from the water tank 4 by means of the pump 12 is heated in the regenerative heat-exchangers 6C, 6D, the heater 5B, the regenerative heat-exchangers 6A, 6B and the heater 5A, in succession, and is thus transformed into steam. This steam is sent to the reversible SOE electrolyzing cell 1. By passing a D.C. electric current between the respective electrodes of the electrolyzing cell 1, oxygen ions in the steam are made to penetrate the electrolyte. Hence, oxygen is separated out of the steam on the side of the anode, and hydrogen is separated out of the steam on the side of the cathode.

The thus separated oxygen heats up the water fed from the water tank 4 to the reversible SOE electrolyzing cell 1 in the regenerative heat-exchangers 6B and 6D, whereby the temperature of the oxygen is lowered. After the oxygen has been compressed by the compressor 22a, it is stored in the oxygen tank 3. Further, the separated hydrogen heats up the water fed from the water tank 4 to the reversible SOE electrolyzing cell 1 in the regenerative heat-exchanger 6A and 6C, whereby the temperature of the hydrogen is lowered. After the hydrogen has been compressed by the compressor 21a, it is stored in the hydrogen tank 2.

On the other hand, at the time of generating electric power, oxygen and hydrogen are fed from the oxygen tank 3 and the hydrogen tank 2, respectively, to the reversible SOE electrolyzing cell 1. In this case, oxygen ions flow reversely through the electrolyte within the electrolyzing cell and are bonded with hydrogen at the cathode to form steam. Electric power is generated when the oxygen ions penetrate the electrolyte, and electric power can be taken out through lead wires extending from the anode and the cathode and connected to an electric load.

At the time of the above-described electric power generation, 40–50% of the energy of the hydrogen becomes heat, and this heat is transmitted to the produced steam. Hence, the temperature of the steam rises. By opening the valve 24a, this heated steam is led from the line 21 to the line 24. After the heated steam has heated water fed from the water feed tank 10 in the heat-exchanger 7A, it enters the line 20. Furthermore, the temperature of the steam flowing from line 24 is decreased in the regenerative heat-exchangers 6A–6D and in the heat-exchanger 7B by heating hydrogen fed from the hydrogen tank 2, oxygen fed from the oxygen tank 3 and water fed from the water feed tank 10, whereby the steam is transformed into water which returns to the water tank 4.

As described above, the water pumped from the water feed tank 10 into the line 25 by the pump 25a is heated by steam issuing from the reversible SOE electrolyzing cell 1 and becomes steam in the heat-exchangers 7A and 7B. This heated steam is fed to the absorption refrigerating machine 8 by actuating the switching valve 11, whereat it is used to refrigerate water in the space-cooling cold water line 27 to produce space-cooling cold water during the summer demand for space-cooling. On the other hand, during the winter demand for space-heating, the absorption refrigerating machine 8 is bypassed by actuating the switching valve 11, and water in the space-heating hot water line 28 is heated in the space-heating heat-exchanger 9 to produce space-heating hot water.

As described above, in the illustrated embodiment, by electrolyzing steam into hydrogen and oxygen in the reversible SOE electrolyzing cell 1 and also by reacting the electrolyzed hydrogen and oxygen to form steam in the reversible SOE electrolyzing cell 1 in a manner which generates electric power, surplus electric power can be stored in the form of hydrogen and oxygen, and electric power can be taken out as necessary.

Moreover, because electric power is stored and generated in the same reversible SOE electrolyzing cell, the system is compact.

Furthermore, the above-described embodiment of the present invention requires neither a special lay of the land nor a limited energy source as is the case with a pumped storage power station. It is possible to install the system of the present invention at any location.

In addition to the above-mentioned merits, in the illustrated embodiment, since hot water or cold water for space-heating or space-cooling can be obtained by making use of heat generated at the time of generating electric power in the reversible SOE electrolyzing cell 1, the efficiency of the system is extremely high (80–85%).

While the present invention has been described above in connection with one preferred embodiment of the invention, it is intended that all matter contained in the above description and illustrated in the accompanying drawings be interpreted as illustrative of and not as a limitation on the scope of the claims.

What is claimed is:

1. A power storage system comprising; a unitary electrolytic and fuel cell having a solid oxide electrolyte, said cell being selectively operable to electrolyze steam to produce hydrogen and oxygen and to generate electric power; a steam feed system connected to said cell so as to deliver steam to said cell; a hydrogen store and an oxygen store connected to said cell so as to store hydrogen and oxygen produced by said cell, respectively, and so as to serve as a supply of hydrogen and oxygen for said cell; a heat-exchanger system connected to said cell so as to effect a heat exchange operation with said cell wherein heat of exhaust produced by said cell when generating electric power and when electrolyzing steam is transferred to said heat-exchanger system; a hot water feed system through which water is fed to effect space heating, said hot water feed system being connected to said heat-exchanger system such that water being fed through said hot water feed system is heated by said heat-exchanger system; an absorption refrigerating machine which uses heat to effect an absorption process, said refrigerating machine being connected to said heat-exchanger system so as to receive heat therefrom to effect said absorption process; and a cold water feed system through which water used for cooling a space is fed, said cold water feed system including a feed line connected to said refrigerating machine such that water being fed through said line is cooled by said refrigerating machine.

2. A power storage system as claimed in claim 1, wherein said cell generates electric power by bonding hydrogen and oxygen, and said exhaust produced by the bonding of hydrogen and oxygen in said cell during the generation of electric power is steam.

3. A power storage system as claimed in claim 1, wherein said steam feed system includes a water store, and said heat-exchanger system includes first and second regenerative heat exchanger systems connected to said cell, said water store being connected to said cell via said first and said second regenerative heat exchangers.

4. A power storage system as claimed in claim 2, wherein said steam feed system includes a water store, and said heat-exchanger system includes first and second regenerative heat exchanger systems connected to said cell, said water store being connected to said cell via said first and said second regenerative heat exchangers.

5. A power storage system as claimed in claim 1, wherein said hydrogen and said oxygen stores are connected to said cell via said heat-exchanger system.

6. A power storage system as claimed in claim 2, wherein said hydrogen and said oxygen stores are connected to said cell via said heat-exchanger system.

7. A power storage system as claimed in claim 3, wherein said oxygen store is connected to said cell via said first regenerative heat-exchanger system, and said hydrogen store is connected to said cell via said second regenerative heat-exchanger system.

8. A power storage system as claimed in claim 4, wherein said oxygen store is connected to said cell via said first regenerative heat-exchanger system, and said hydrogen store is connected to said cell via said second regenerative heat-exchanger system.

* * * * *